United States Patent
Navarini et al.

(10) Patent No.: US 8,127,665 B2
(45) Date of Patent: Mar. 6, 2012

(54) APPARATUS FOR PREPARING A COFFEE BEVERAGE

(75) Inventors: Luciano Navarini, Trieste (IT); Furio Suggi Liverani, Trieste (IT); Massimo Barnaba', Trieste (IT); Franciscus Benedictus Maria Van Eeden, Milan (IT)

(73) Assignee: Illycaffe' S.p.A., Trieste (IT)

( * ) Notice: Subject to any disclaimer, the term of this patent is extended or adjusted under 35 U.S.C. 154(b) by 762 days.

(21) Appl. No.: 12/159,568

(22) PCT Filed: Dec. 18, 2006

(86) PCT No.: PCT/EP2006/069863
§ 371 (c)(1),
(2), (4) Date: Sep. 25, 2008

(87) PCT Pub. No.: WO2007/074100
PCT Pub. Date: Jul. 5, 2007

(65) Prior Publication Data
US 2009/0126576 A1    May 21, 2009

(30) Foreign Application Priority Data
Dec. 28, 2005 (IT) .............................. MO2005A0351

(51) Int. Cl.
*A47J 31/30* (2006.01)

(52) U.S. Cl. ............................ 99/303; 99/293; 99/302 R

(58) Field of Classification Search .................... 99/303, 99/292, 293, 302 R, 307, 308
See application file for complete search history.

(56) References Cited

U.S. PATENT DOCUMENTS

| 515,008 A | * | 2/1894 | McClellan ................. 126/382.1 |
| 5,699,718 A |   | 12/1997 | Yung et al. |
| 5,902,620 A | * | 5/1999 | Nolan ........................... 426/241 |
| 2007/0248728 A1 | * | 10/2007 | Navarini et al. .............. 426/433 |

FOREIGN PATENT DOCUMENTS
WO     2006/010404     2/2006

OTHER PUBLICATIONS
International Search Report for PCT/EP2006/069863, filed Mar. 30, 2008.

\* cited by examiner

*Primary Examiner* — Reginald L Alexander
(74) *Attorney, Agent, or Firm* — Nixon & Vanderhye P.C.

(57) ABSTRACT

Apparatus comprising a containing element for heating an extracting fluid, a transferring arrangement for causing the passage of the fluid through a dose of coffee and a collecting arrangement for collecting a beverage produced with the extracting fluid during the passage: there being provided a separating arrangement arranged for separating a fraction of the beverage obtained with a prevalently liquid phase of the fluid from a further fraction of the beverage obtained with a prevalently steam phase of the fluid, the separating arrangement leading into distinct zones of the collecting arrangement.

12 Claims, 10 Drawing Sheets

APPARATUS FOR PREPARING A COFFEE BEVERAGE

CROSS-REFERENCE TO RELATED APPLICATIONS

This application is the U.S. national phase of International Application No. PCT/EP2006/069863, filed 18 Dec. 2006, which designated the U.S. and claims priority to Italy Patent Application No. MO2005A000351, filed 28 Dec. 2005, the entire contents of each of which are hereby incorporated by reference.

The invention relates to an improved apparatus for obtaining coffee-based beverages, in particular to be prepared with steam-pressure coffee machines.

Various types of steam-pressure coffee machines are known, which are used above all for domestic use, in which the steam generated inside a boiler exerts a pressure that thrusts the water contained in the boiler to pass through a panel of coffee powder, producing the coffee beverage.

Such steam-pressure coffee machines shall hereinafter be referred as "Mocha".

"Mocha" coffee machines, in the embodiment shown in FIG. 10a, comprise two receptacles that are hermetically tightenable together: a first receptacle acts as a boiler shaped in such a way as to contain water to be heated and to be itself heated by a suitable source of heat, and is provided with an relief valve that is suitably calibrated and arranged for preventing the pressure inside the boiler from exceeding a set limit value (in the event of a fault), a second receptacle that acts as a tank in which the produced beverage is collected.

"Mocha" coffee machines further comprise a filtering funnel, interposed between the boiler and the tank and shaped so as to receive a set quantity of coffee powder, and a duct for conveying the produced coffee beverage to the tank.

When it is desired to prepare the coffee, a desired quantity of water is introduced into the boiler and a desired quantity of coffee is introduced into the filtering funnel container and the water of the boiler is heated to take it to boiling point.

As known to those skilled in the art, the heating produces a pressure increase inside the boiler that thrusts the water therein to pass through the filtering funnel, pass through the coffee powder, thereby imbibing it and consequently giving rise to the coffee beverage, which passes through a second filter provided at the base of the collecting tank, rises up along the duct provided inside the tank and emerges from the upper part of the duct, so collecting in the collecting tank.

In order to generate the heating of the boiler water, different sources of heat can be used, for example the flame of a common gas cooker, or an electric resistance.

In another type of steam-pressure coffee machine, like the one shown in FIG. 10b, the collecting tank of the coffee beverage is missing and the duct is so shaped dimensioned in such a way as to convey the produced beverage directly into suitable containers, for example one or more cups of a user that can be placed at an outlet portion of the duct.

The duct can be provided with a upper cover that is shaped in such a way as to define on a side surface of the conduit suitable exit orifices for the exit of the beverage and is arranged for preventing the beverage thrust by high pressure from spurting outside the tank.

In a further type of steam-pressure coffee machine, shown in FIG. 10c, an autoclave boiler is provided inside which the water to be heated is introduced that is electrically heated and in which, following heating, steam is generated into the boiler that pushes the water through a panel of coffee placed on a filter holder from which the produced beverage exits that is collected in suitable containers, for example one or more cups of users, which are placed at the filter holder.

The filter holder is shaped in such a way as to be similar to those used in machines for espresso coffee, in order to simulate the preparation of espresso coffee.

In order for such coffee machines to simulate the espresso coffee preparation, it is necessary for them to deliver the coffee beverage in a reasonably short time, and thus for the temperature in the boiler to have values significantly above 100° C., and for these values to be reached in a particularly short time.

A drawback of steam-pressure "Mocha" coffee machines such as those disclosed above, is that the beverage produced has organoleptic features that are inferior to those of beverages obtained by infusion, or with "espresso" coffee machines in which the extraction is not achieved by steam pressure but by a pump that drives the hot water into contact with the coffee powder.

This is due to the particular temperature and pressure conditions that are generated inside such coffee machines during the extraction process.

A further difference between extraction through infusion or pressure percolation achieved with "espresso" coffee machines and extraction in steam-pressure coffee machines is that in the latter coffee machines part of the coffee beverage is obtained by making water in steam state to pass through the coffee powder.

In order to overcome this problem, EP0607765 provides a coffee machine comprising two distinct boilers in which to introduce water: a first boiler to be brought into contact with a heat source and a second boiler interposed between the first boiler and a filter containing the coffee powder.

When the water in the first boiler is brought to boiling point, it exerts a thrust action against a piston interposed between the first boiler and the second boiler that forces the water of the second boiler, which is hot but at a lower temperature than boiling point, to the coffee powder. In this way, the coffee beverage is obtained by imbibing the coffee powder with water at a temperature between 75° and 95° C.

Providing two distinct boilers for the water, one with the water to be brought to boiling point and one with the water for imbibing the coffee powder, is also known from EP0148982.

The presence of the second boiler for water makes the coffee machines seen above constructionally more complex and above all considerably more bulky than common coffee machines.

Further, these coffee machines have greater energy consumption than common coffee machines as a greater quantity of water has to be heated, and a longer time is required to prepare the coffee beverage.

Cooling the water and/or the steam that is thrust up from the boiler by the thrust of the pressure generated inside the latter by the heating of the water is further known, for example from WO94/07400 or IT1245706.

The path of the water and/or the steam to the coffee powder is varied in such a way as to provide, before the passage through the coffee powder, the passage through exchanger elements in which the water cools and any steam present condenses.

Such solutions nevertheless have numerous drawbacks, in fact the presence of the exchanger element makes such coffee machines more complex and bulkier than common coffee machines.

Further, maintenance and cleaning operations are more delicate and require more time and care than are necessary for common coffee machines.

Further, such coffee machines consume more energy than common coffee machines, as all the water in the boiler is first heated and then cooled before coming into contact with the coffee powder.

An object of the invention is to provide an improved apparatus for producing coffee beverages.

Still another object is to provide a simple and cheap apparatus that enables a coffee beverage with superior organoleptic features to be obtained.

A further object is to provide a simplified apparatus that enables a coffee beverage to be obtained using water that is not in steam state.

In a first aspect of the invention, there is provided an apparatus comprising a containing element for heating an extracting fluid, a transferring arrangement for causing the passage of said fluid through a dose of coffee, and a collecting arrangement for collecting a beverage produced with said extracting fluid during said passage, wherein it comprises a separating arrangement arranged for separating a fraction of said beverage obtained with a prevalently liquid phase of said fluid from a further fraction of said beverage obtained with a prevalently steam phase of said fluid, said separating arrangement leading into distinct zones of said collecting arrangement.

Owing to the invention, it is possible to obtain a beverage by means of extraction of a set quantity of coffee only with water, ie. preventing the beverage also containing an extract obtained when the coffee is imbibed with a fluid containing steam.

The coffee may be in the form of powder or anyway minced to promote extraction, or be in the form of capsules, portions or cartridges containing desired predosed quantities of coffee powder.

In this way, it is possible to obtain a beverage with superior organoleptic features and which is comparable with the beverage obtained with "espresso" coffee machines.

The separating arrangement can be connected, making the appropriate modifications, to a "Mocha" coffee machine of any known type that can then be used for obtaining a high quality coffee beverage.

The invention will be better understood and implemented with reference to the attached drawings that shown an embodiment by way of non-limiting example, in which.

Figure 1:
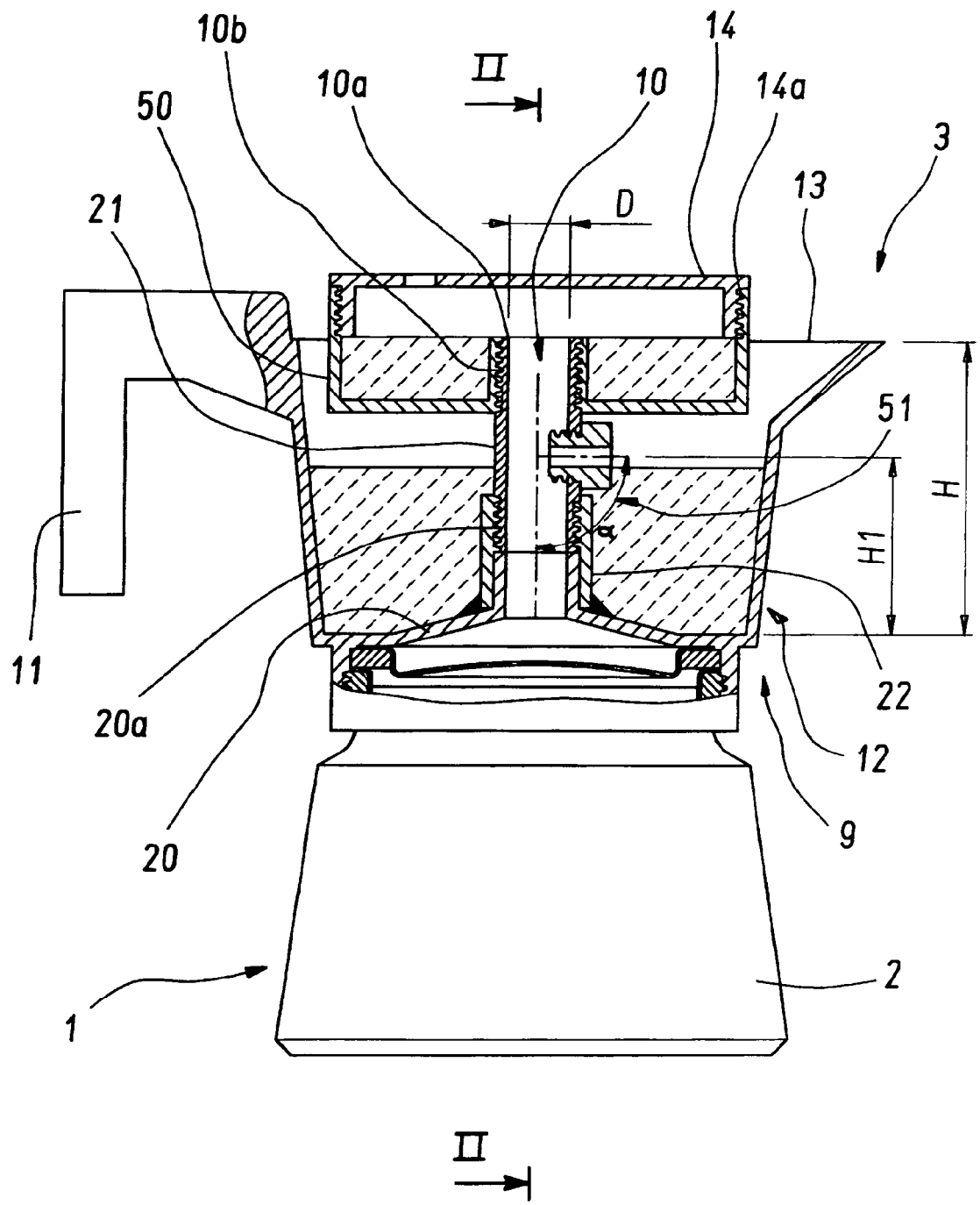
FIG. 1 is a partially sectioned view of a Mocha.

With reference to FIG. 1, the coffee machine 1 comprises a boiler 2 into which the water to be heated is introduced, which is placed in contact with a source of heat and which is provided with a safety valve (not shown) arranged for preventing pressure inside the boiler 2 exceeding a given maximum value and an upper portion 3 that is tightened in use onto the boiler 2.

Figure 2:
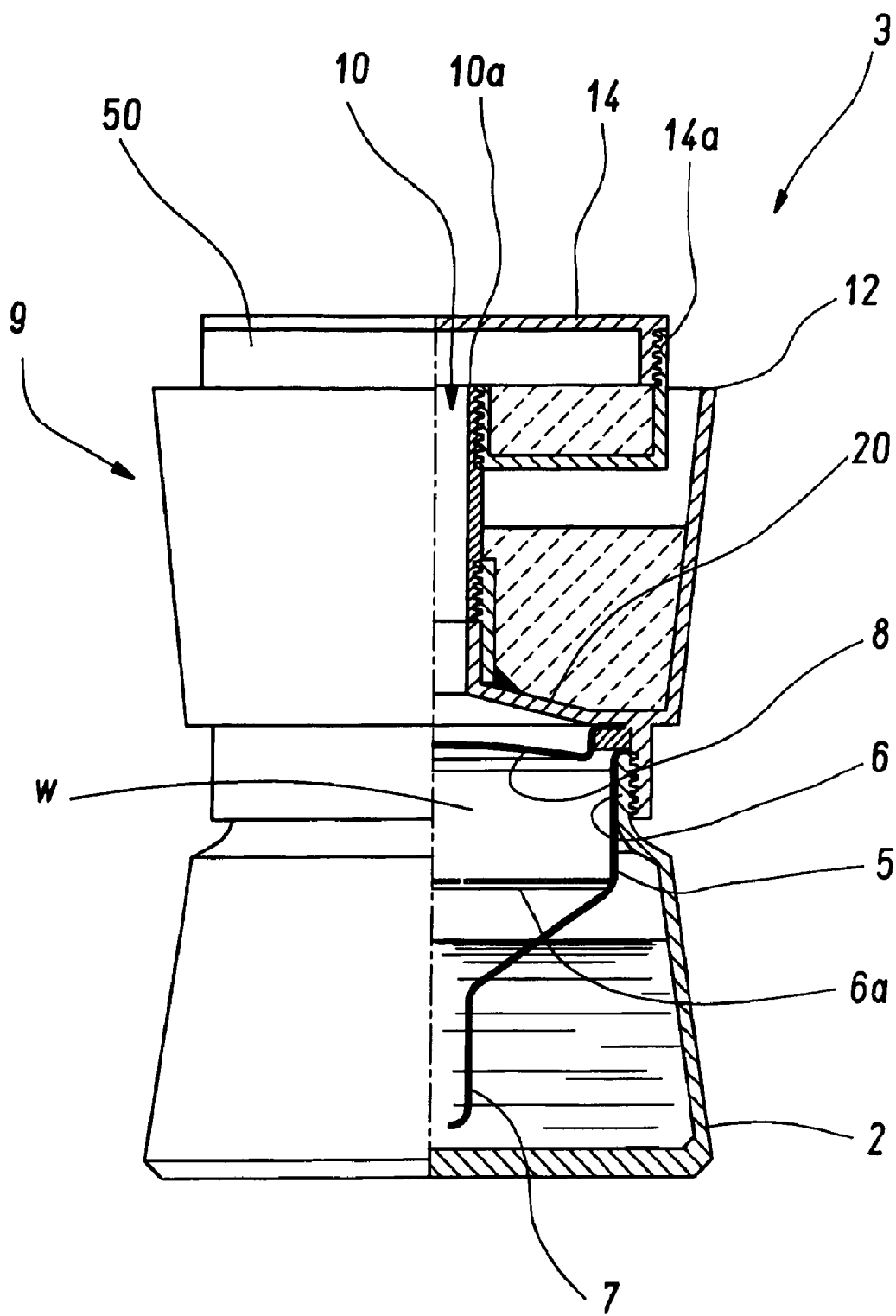
FIG. 2 is a partially sectioned view along the plane II-II of FIG. 1.

As shown in FIG. 2, a funnel container 5, comprising a containing cavity 6 that is bounded below by a filter surface 6a, and inside which a desired quantity of coffee powder is introduced that is indicated by W, and a duct 7 projecting from the containing cavity 6, is positioned inside the boiler 2 in such a way that the duct 7 projects from the containing cavity 6 to the bottom of the boiler 2.

The upper portion 3 comprises a lower filtering surface 8, a tank 9 in which the produced coffee beverage collects and which is connected to the lower surface 8 by means of a conduit 10, a grip 11 for facilitating the grasp by a user of the coffee machine 1, a side surface 12 provided with a projecting portion 13 spout shaped through which the beverage is poured.

The conduit 10 comprises a substantially frustum conical portion 20 arranged on the side of the lower portion 8 and a conveying portion 21 connected to the frustum conical portion 20 by a base portion 22, through a threaded coupling 20a.

The conveying portion 21 has a circular cross section with a diameter D comprised for example between 2 and 40 mm.

The conveying portion 21 has an end 10a free, i.e. opposite the frustum conical portion 20, that leads into a chamber 50 mounted on the end 10a by means of a thread 10b and extending circumferentially above it.

The removable lid 14 is mounted by means of a further thread 14a on an edge of an external peripheral surface of the chamber 50.

The conveying portion 21 has, in an intermediate portion of the length thereof, a dispensing nozzle 51 positioned at a distance H1 from the bottom of the tank 9.

The distance H1 is selected in such a way as to define inside the tank 9 a desired collecting volume of the beverage obtained with liquid. In fact, the frustum conical portion 20 conveys the coffee beverage pouring out from the lower portion 8 towards the conveying portion 21 and then discharged into the tank 9 through the dispensing nozzle 51. The conveying portion 21 can have a cylindrical shape or be slightly upwardly flared.

The conduit 10 has an overall longitudinal extent H, defined as the distance between the lower filtering portion 8 and the end 10a, for example comprised between 5 and 200 mm, and is shaped in such a way as to oppose the least possible resistance to the pouring out of the beverage obtained by extraction with steam, in order to facilitate—as disclosed below in greater detail—the separation between the fraction of beverage obtained with a prevalent liquid phase from the fraction obtained with a prevalent steam phase.

In particular, the end 10a—from which the coffee beverage obtained by steam exits—has a completely free exit end, that is portions of partial covering of the end 10a are not provided, which portions are on the other hand provided in the prior art.

In this way, the fraction of beverage obtained with steam is collected in the chamber 50 whilst the part of beverage obtained with an extracting fluid in liquid phase is discharged into the lower part of the tank 9.

The nozzle 51 has a longitudinal axis that forms with the axis of the conveying conduit 10 an angle $\alpha$ comprised between 0° and 90°.

The section of the dispensing nozzle 51 is almost circular with a diameter for example comprised between 1 and 10 mm.

In accordance with the present invention, the nozzle 51 can be replaced by a plurality of nozzles, or slits, the total passage area of which is equivalent to that of an almost circular single nozzle with a prefixed diameter.

Said nozzle can be suitably shaped in such a way that the pouring out beverage is enhanced with froth simulating the appearance of espresso coffee.

Figure 3:
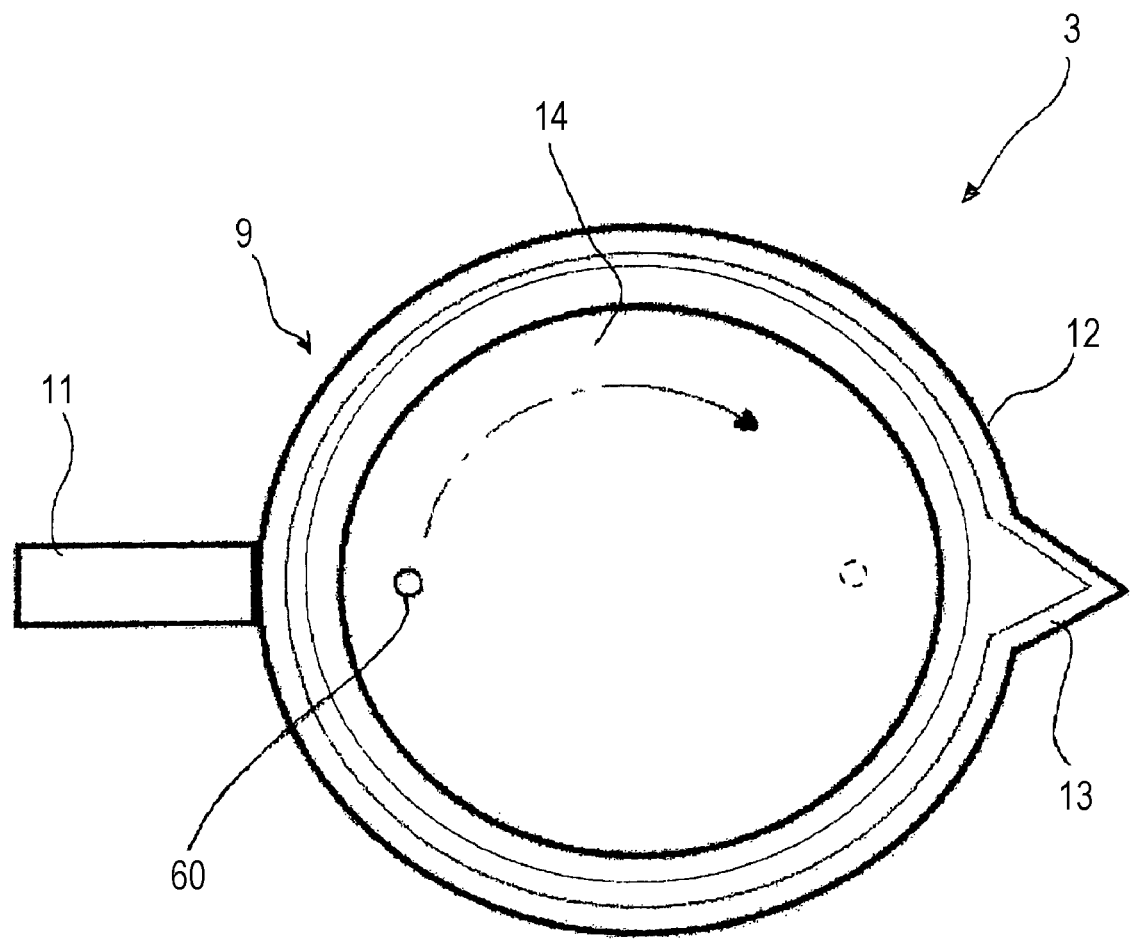
FIG. 3 is a view from above of FIG. 1.

With reference to FIG. 3, it is shown that the removable lid 14 can have a circular plan shape such as to be included, and therefore contained, in the upper part of the tank 9. When necessary, the lid can be dismantled from the chamber 50, so that it is possible to proceed to complete cleaning of the interior of the chamber 50.

The lid 14 is further provided with a vent hole 60 through which the steam can be discharged that is generated by the boiler 2 that has drawn part of the beverage to the chamber 50. The hole 60 is positioned on the side of grip 11 in such a way that when a user pours the beverage from the spout 13 no liquid fraction contained in the chamber 50 exits. When on the other hand the exit of the beverage from the chamber 50, is required, it is possible to rotate the lid by approximately 180°, taking the vent hole 60 in the dotted position nearest the spout 13 and thus emptying the beverage with a simple and intuitive manoeuvre.

Figure 4:
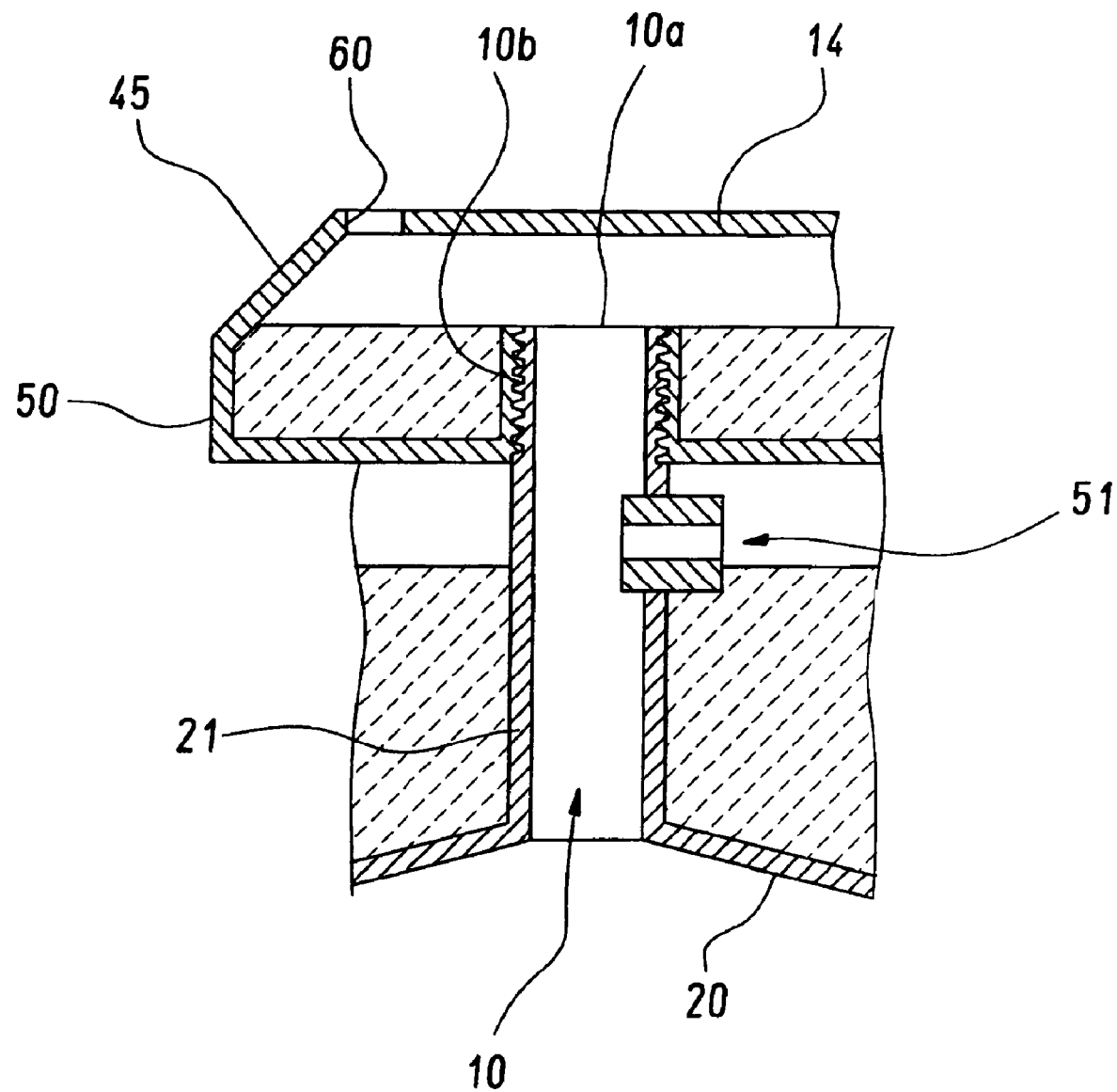
FIG. 4 is an enlarged detail of FIG. 1.

In the embodiment shown in FIG. 4, the conduit 10 has a conveying portion 21 that emerges directly, i.e. without the interposition of coupling members, from the frustum conical surface 20. Further, the nozzle 51 is fixed with a certain geometrical interference in a suitable hole of the conveying portion 21.

In the same embodiment it is further shown that the lid 14 can be firmly anchored to the side wall of the chamber 50 to form a single body with the latter. Furthermore, between the lid 14 and the side surface of the chamber 50 a frustum conical connecting surface 45 can be provided.

Figure 5:
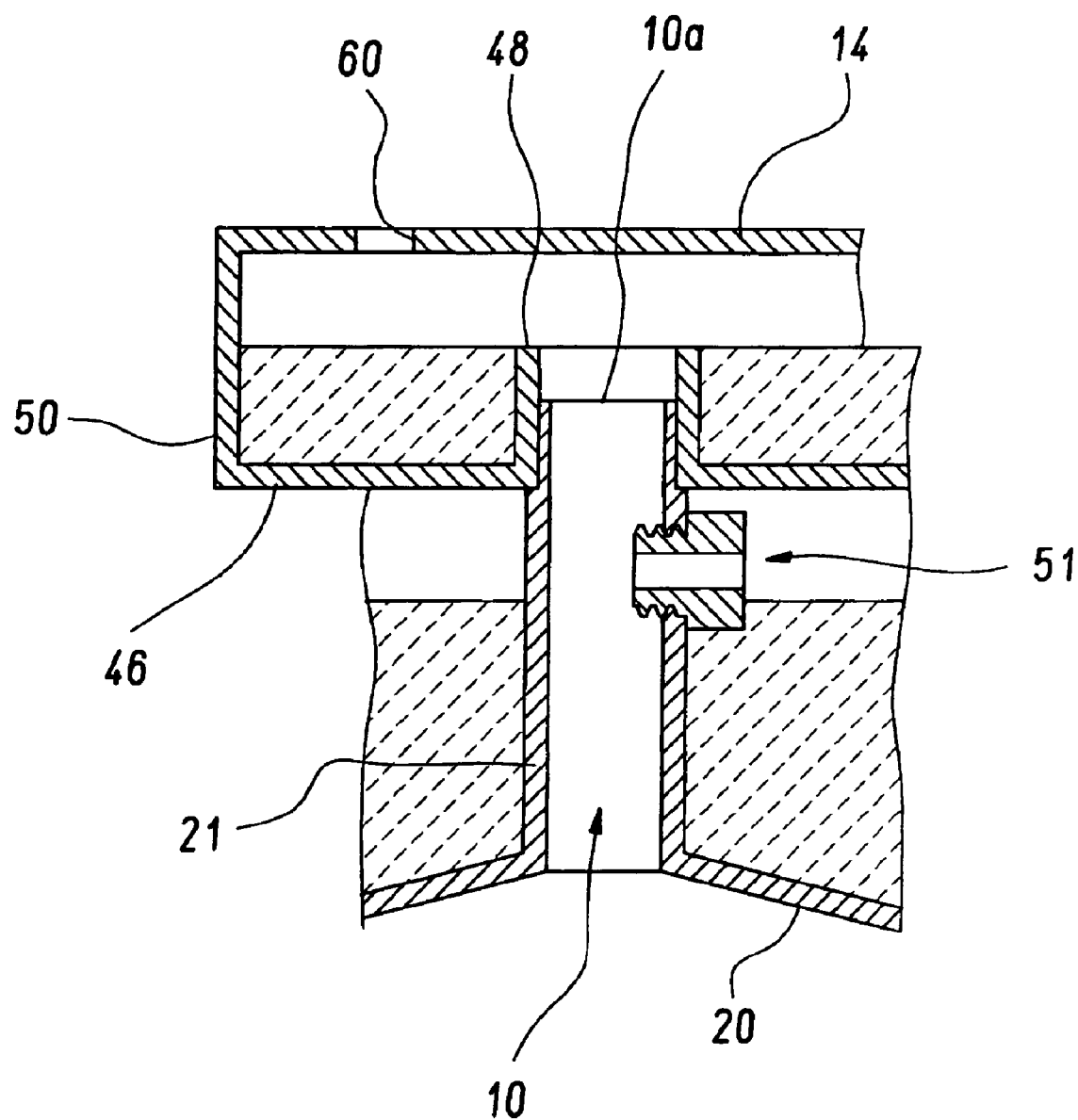
FIGS. 5 to 8 are variations of the detail shown in FIG. 4.

In the embodiment in FIG. 5, there is shown a type of coupling between the chamber 50 and the conduit 10, comprising an abutting surface obtained at an external dimension variation of the conduit 10, on which a sleeve 48 is restingly engaged that leads into the central part of a bottom surface 46 of the chamber 50. The chamber 50 can be retained on the conduit 10 by means of quick-fit fittings, such as bayonet fittings, snap fittings, or the like.

Figure 6:
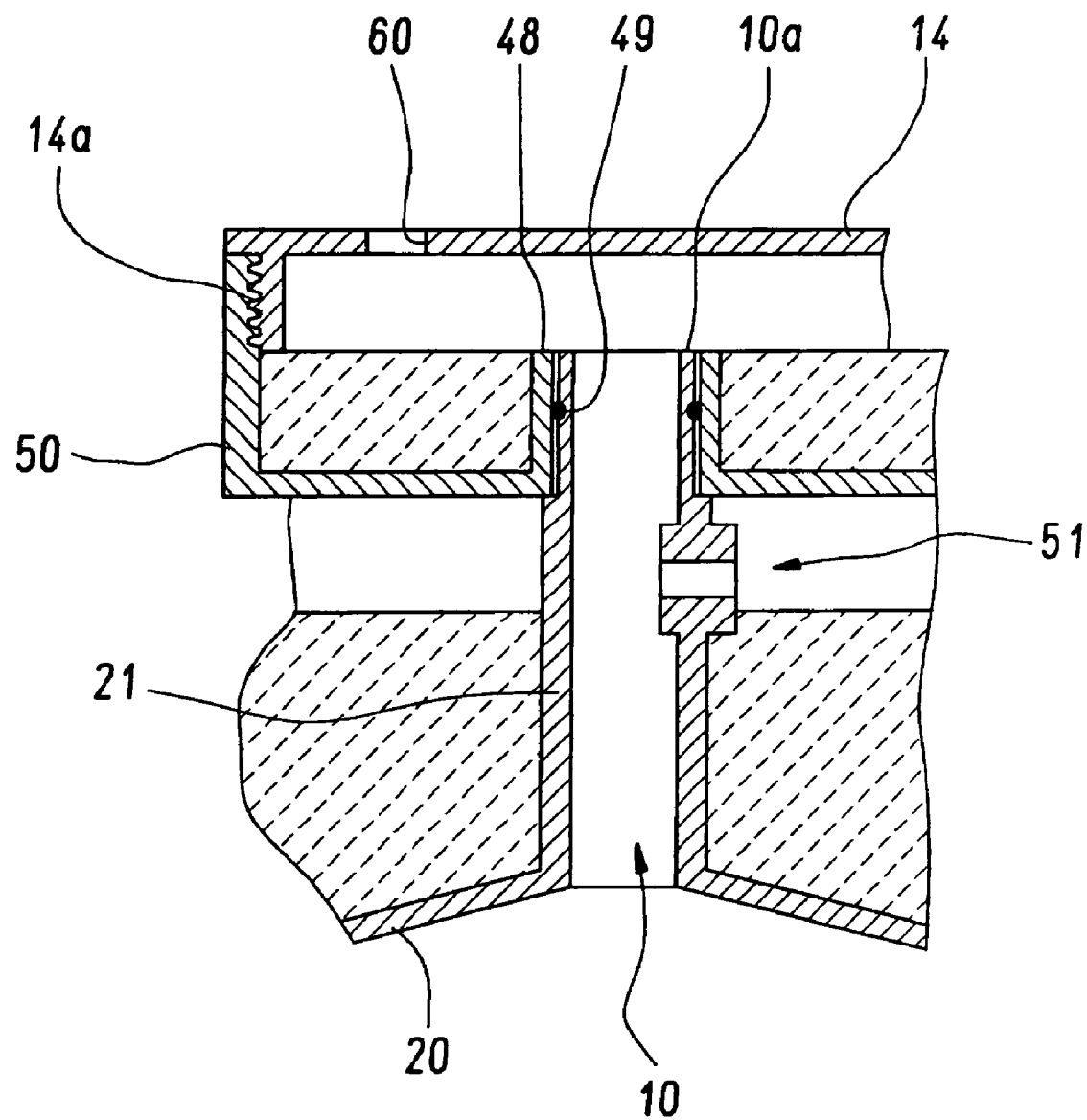

In the embodiment in FIG. 6, between the sleeve 48 and the conduit 10 there is interposed a seal ring 49 in such a way that a certain forcing degree is ensured when the chamber 50 is mounted on the end 10*a*.

Figure 7:
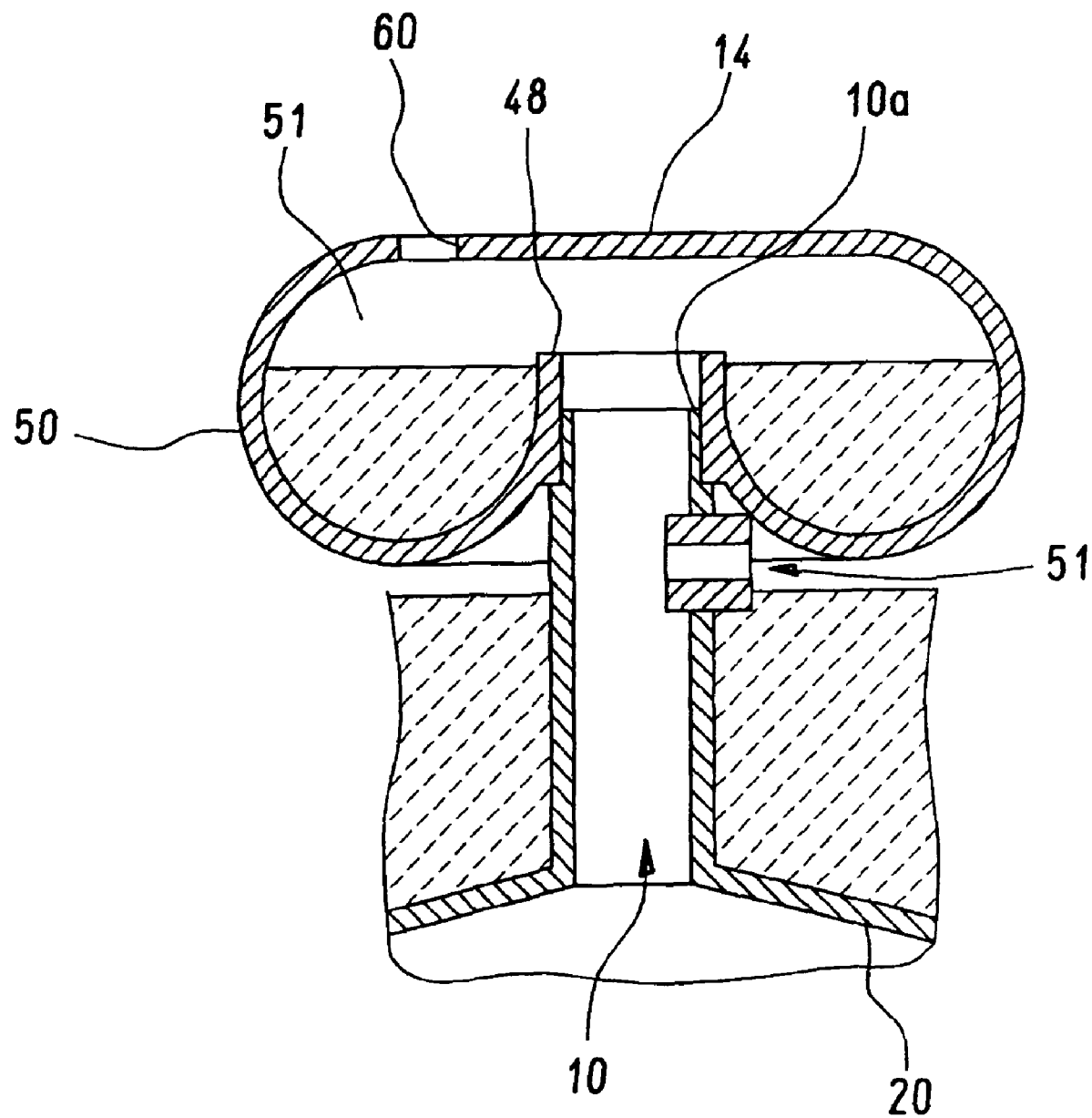

In FIG. 7 it is shown how the chamber 50 can have a toroidal shape 51, which enables the presence of sharp edges inside the tank 9 to be avoided. The chamber 50 can be shaped in the most widely varying forms to meet functional and/or aesthetic needs; it can for example act as a lid for the collecting tank 9.

Figure 8:
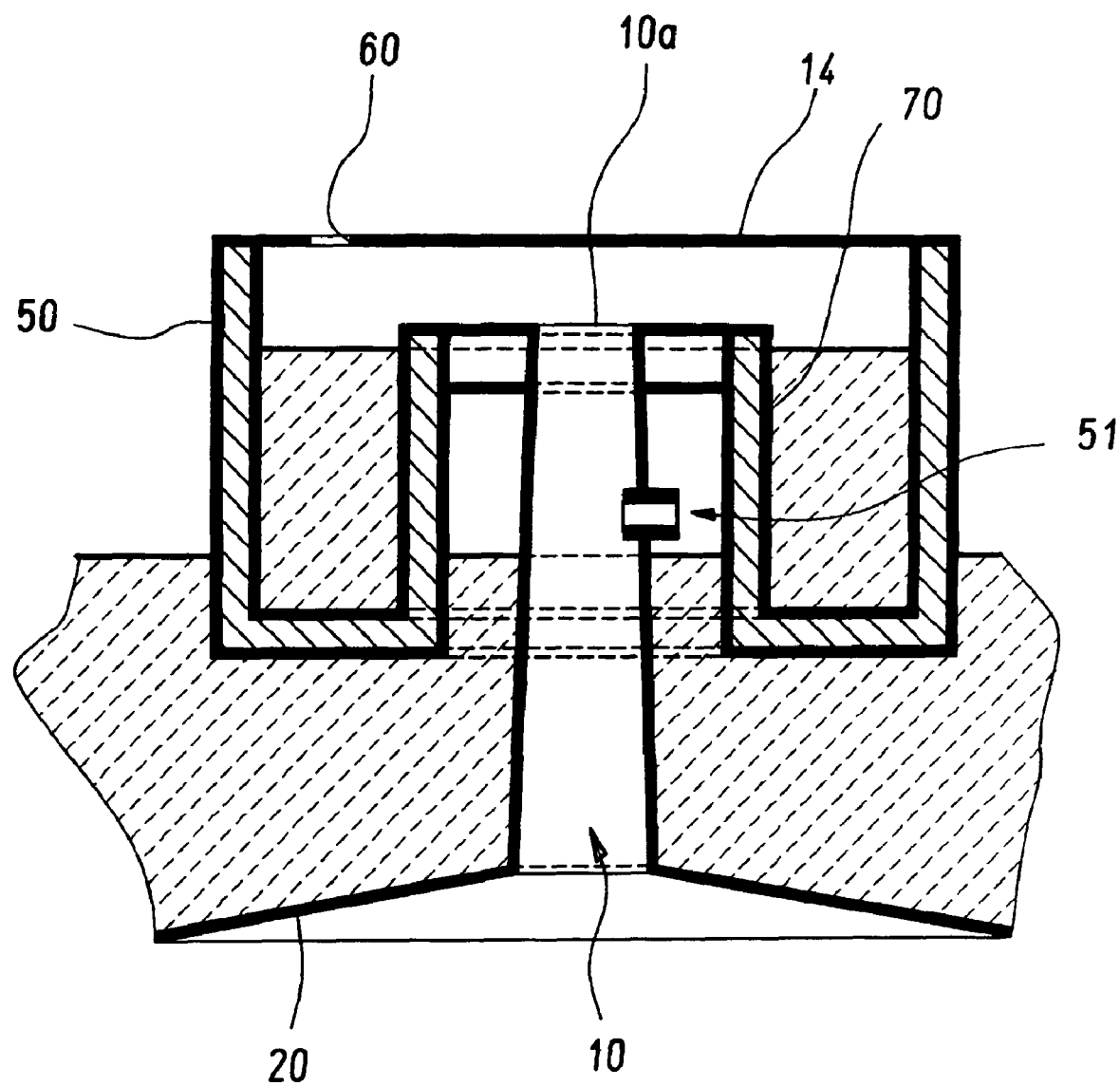

Furthermore, if it is necessary to provide a great containing volume of the beverage obtained with steam-based extraction, the chamber 50 can have a substantial extent along the length of the conduit 10. In this case, as shown in FIG. 8, there can be provided an internal wall 70 of the chamber 50 arranged in a coaxial position with respect to the side wall of the chamber 50 and inside the latter, so as to be arranged at a certain distance from the outside of the conduit 10.

If required, the axial extent of the internal wall 70 can be such as to surround the nozzle 51.

Figure 9:
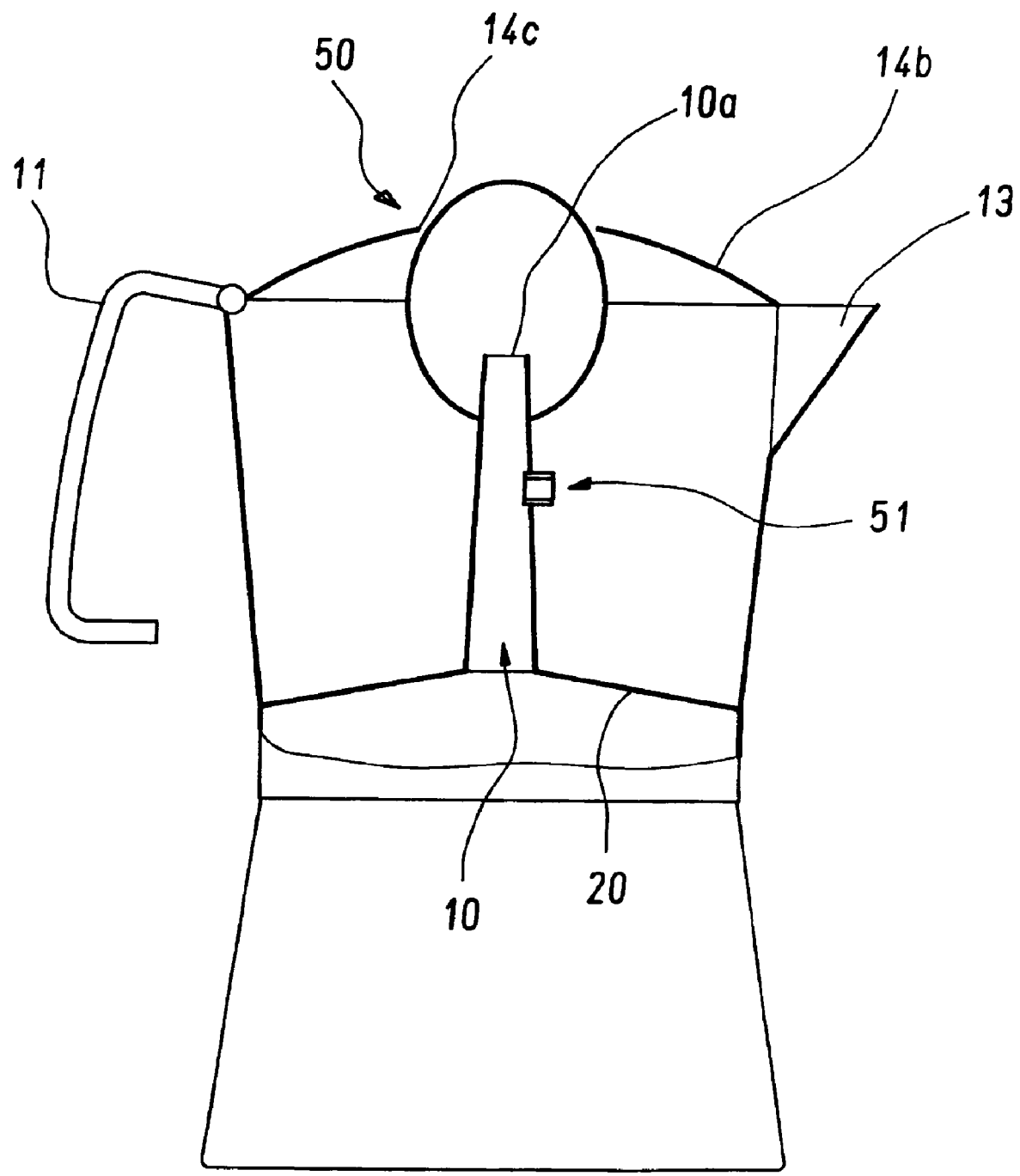
FIG. 9 is a partially sectioned schematic view of a version of FIG. 1.
Figure 10A:
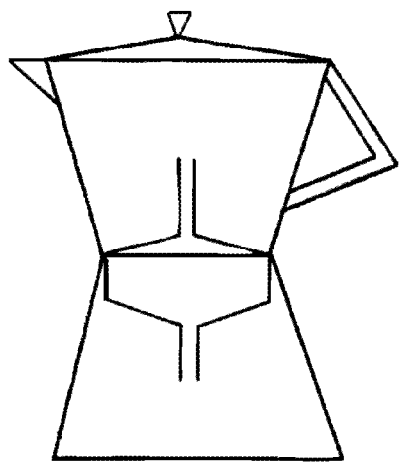
FIGS. 10a to 10c are schematic views of prior-art coffee machines.
Figure 10B:
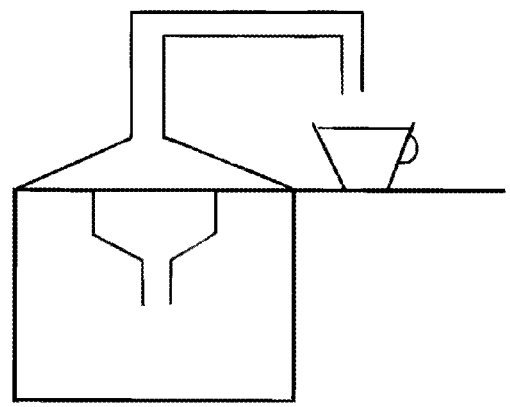
Figure 10C:
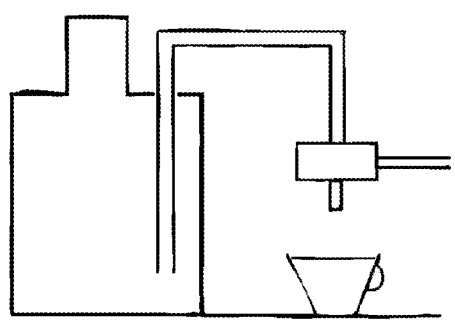

In FIG. 9 there is shown another version in which the chamber 50 is egg-shaped in such a way as the external side surface of the chamber 50 is positioned at a certain distance from the internal wall of the tank 9 and enable facilitated access to the chamber 50 to facilitate effective cleaning thereof without having to remove the chamber 50.

An additional lid 14*b* can be further provided hinged onto an edge zone of the tank 9 and provided with a central opening 14*c* that surrounds the upper part of the chamber 50.

In order to prepare a coffee beverage, a suitable quantity of water is introduced inside the boiler 2, a suitable quantity of coffee powder is introduced into the funnel container 5 that is inserted inside the boiler 2, the upper portion 3 is tightened onto the boiler 2 and then the coffee machine 1 is subjected to a heat source.

The water in the boiler 2 heats up, causing a pressure increase that thrusts part of the water in the boiler 2 to rise up through the duct 7 until it comes into contact with the coffee powder, imbibing it and extracting the coffee beverage thereof that passes through the filtering surface 8, rises part of the conduit 10 until it reaches the dispensing nozzle 51 and exits therefrom to be collected in the lower part of the tank 9.

Through the effect of the heat and the consequent increase in the pressure and temperature inside the boiler 2, after a certain interval of time, extraction of the coffee beverage occurs through solid-liquid-steam extraction.

In this extraction phase the flow of produced beverage decreases over time but the thrust pressure increases, i.e. the beverage produced is subjected to a thrust pressure during the rising in the conduit 10 that is greater than that of the solid-liquid extraction phase, so the beverage produced flows along the entire conduit 10, pour out from the end 10*a* thereof and collects in the chamber 50.

In this way, it is prevented that the fraction of beverage obtained by solid-liquid-steam extraction mixes with the fraction of beverage obtained by solid-liquid extraction and inside the chamber 50*a* beverage with inferior organoleptic features is obtained that is henceforth known as a rejected beverage.

By varying the diameter of the dispensing nozzle 51, the height H and the height H1, it is possible to vary the ratio between the fraction of accepted beverage and the fraction of rejected beverage collected inside the tank 9.

With the coffee machine 1 disclosed above, it is possible to obtain, in a simple and cheap manner, a coffee beverage with superior organoleptic features, simply by separating from the fraction of beverage with a pleasant flavour the fraction of beverage with an unpleasant flavour.

It is further observed that the manoeuvre necessary for pouring the beverage proceeds in an intuitive manner similarly to what is provided with the use of a conventional Mocha.

The invention claimed is:

1. Apparatus comprising a containing element for heating an extracting fluid, a transferring arrangement for causing the passage of said fluid through a cavity containing a dose of coffee, and a collecting arrangement for collecting a beverage produced with said extracting fluid during said passage, wherein it comprises a separating arrangement arranged for separating a fraction of said beverage obtained with a prevalently liquid phase of said fluid from a further fraction of said beverage obtained with a prevalently steam phase of said fluid, said separating arrangement leading into distinct zones of said collecting arrangement and comprising an end of a conduit that extends from a bottom zone of said collecting arrangement, wherein said separating arrangement comprises a chamber communicating with said conduit in such a way as to envelop said end, said chamber being coupled with said conduit through a removable coupling arrangement.

2. Apparatus according to claim 1, wherein said separating arrangement comprises a nozzle arranged along said conduit and communicating with a bottom zone of said collecting arrangement.

3. Apparatus according to claim 1, wherein said chamber is integral with said conduit.

4. Apparatus according to claim 1, wherein said removable coupling arrangement is chosen from a group comprising: threaded couplings, bayonet fittings, with geometrical interference.

5. Apparatus according to claim 1, wherein said removable coupling arrangement comprises a sleeve arranged inside said chamber.

6. Apparatus according to claim 1, wherein said chamber is provided with a lid.

7. Apparatus according to claim 1, wherein said chamber is provided with a vent hole.

8. Apparatus according to claim 6, wherein said chamber forms a single body with said lid.

9. Apparatus according to claim 6, wherein said lid is fixed to said chamber.

10. Apparatus according to claim 1, wherein said chamber has a shape such as to perform desired functional tasks.

11. Apparatus according to claim 1, wherein said collecting arrangement is provided with a rotatable lid that substantially stands above at least part of said chamber.

12. Apparatus according to claim 11, wherein said lid is provided with a central opening that is coupled with the upper part of said chamber.

* * * * *